United States Patent
Sugiyama et al.

(10) Patent No.: US 11,439,951 B2
(45) Date of Patent: Sep. 13, 2022

(54) CONTROL SYSTEM FOR VEHICLE HAVING CO2 CAPTURING DEVICE

(71) Applicant: TOYOTA JIDOSHA KABUSHIKI KAISHA, Toyota (JP)

(72) Inventors: Kouseki Sugiyama, Sunto-gun (JP); Jun Miyagawa, Numazu (JP); Daiki Yokoyama, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 207 days.

(21) Appl. No.: 16/994,815

(22) Filed: Aug. 17, 2020

(65) Prior Publication Data

US 2021/0053011 A1 Feb. 25, 2021

(30) Foreign Application Priority Data

Aug. 23, 2019 (JP) .............................. JP2019-152752

(51) Int. Cl.
  *B01D 53/62* (2006.01)
  *B01D 53/92* (2006.01)
  *F01N 3/08* (2006.01)
  *F01N 3/24* (2006.01)

(52) U.S. Cl.
  CPC .............. *B01D 53/62* (2013.01); *B01D 53/92* (2013.01); *F01N 3/0857* (2013.01); *F01N 3/0871* (2013.01); *F01N 3/24* (2013.01); *B01D 2257/504* (2013.01); *F01N 2240/02* (2013.01); *F01N 2240/04* (2013.01); *F01N 2240/18* (2013.01)

(58) Field of Classification Search
  CPC .. B01D 53/62; B01D 2257/504; B01D 53/92; F01N 2240/04; F01N 2240/18; F01N 2240/26; F01N 3/0857; F01N 3/0871; F01N 3/023; F01N 2240/02; Y02C 20/40
  See application file for complete search history.

(56) References Cited

U.S. PATENT DOCUMENTS

| | | | |
|---|---|---|---|
| 9,682,344 B1 * | 6/2017 | Hall | F02M 21/0221 |
| 2012/0272657 A1 * | 11/2012 | Baker | F01K 5/00 |
| | | | 60/772 |
| 2013/0298532 A1 * | 11/2013 | Hamad | F01N 3/00 |
| | | | 60/274 |
| 2013/0298761 A1 * | 11/2013 | Hamad | B01D 53/1493 |
| | | | 96/242 |
| 2014/0099245 A1 * | 4/2014 | Hamad | B01D 53/92 |
| | | | 96/242 |

(Continued)

FOREIGN PATENT DOCUMENTS

| | | |
|---|---|---|
| JP | 2014-509360 A | 4/2014 |
| WO | WO 2016/076041 A1 | 5/2016 |

*Primary Examiner* — Anthony Ayala Delgado
(74) *Attorney, Agent, or Firm* — Finnegan, Henderson, Farabow, Garrett & Dunner, LLP

(57) ABSTRACT

A control system for a vehicle having a CO2 capturing device configured to capture CO2 certainly from gas streams. The CO2 captured by the CO2 capturing device is desorbed from the CO2 capturing device by an energy available in the vehicle. A controller is configured to discharge the CO2 captured by the CO2 capturing device into the recovery station by energy delivered from the recovery station to the CO2 capturing device when the energy available in the vehicle is less than a predetermined value.

14 Claims, 13 Drawing Sheets

(56) References Cited

U.S. PATENT DOCUMENTS

| | | | |
|---|---|---|---|
| 2016/0369674 A1* | 12/2016 | Younes | F01N 3/0885 |
| 2017/0183996 A1* | 6/2017 | Baker | F01N 3/0205 |
| 2017/0306825 A1* | 10/2017 | Kaneeda | F01N 3/24 |
| 2018/0216532 A1* | 8/2018 | Smith | F02C 7/10 |
| 2019/0209961 A1* | 7/2019 | Kennedy | C12P 1/00 |

* cited by examiner

CONTROL SYSTEM FOR VEHICLE HAVING CO2 CAPTURING DEVICE

CROSS-REFERENCE TO RELATED APPLICATIONS

The present disclosure claims the benefit of Japanese Patent Application No. 2019-152752 filed on Aug. 23, 2019 with the Japanese Patent Office, the disclosures of which are incorporated herein by reference in its entirety.

BACKGROUND

Field of the Disclosure

Embodiments of the present disclosure relate to the art of a control system for a vehicle having a CO2 capturing device to collect CO2 in the atmosphere and in the exhaust gas discharged from an internal combustion engine.

Discussion of the Related Art

WO 2016/076041 describes a vehicle equipped with a CO2 recovery device. In the vehicle taught by WO 2016/076041 A1, CO2 emitted from an internal combustion engine and CO2 in the air are recovered by a capturing material disposed at a through channel of gas. The captured CO2 is desorbed from the capturing material by heat generated from the internal combustion engine, and react with hydrogen to generate methane used as fuel.

JP-A-2014-509360 also describes a vehicle equipped with a CO2 capturing device. In the vehicle taught by JP-A-2014-509360, exhaust gas emitted from an engine is supplied to a capture agent to capture CO2 contained in the exhaust gas, and CO2 captured by the capture agent is discharged into the atmosphere. According to the teachings of JP-A-2014-509360, the captured CO2 is heated by the engine's waste heat to be desorbed from the capture agent, and then compressed for storage as a gas.

CO2 in the air may be reduced by the above-mentioned conventional recovery device or capturing system to prevent global warming. However, according to the teachings of WO 2016/076041 A1 and JP-A-2014-509360, CO2 is captured while the exhaust gas is emitted from the engine. That is, when capturing CO2 contained in the exhaust gas in the vehicles described in the above-explained conventional arts, the engine also generates heat. For example, the CO2 captured by the conventional capturing system is discharged into a predetermined storage station when the captured CO2 reaches almost a capacity of the capturing agent. According to the above-explained conventional arts, therefore, the CO2 may not be desorbed sufficiently from the capturing agent to be stored in the storage station if the heat generated by the engine is insufficient.

SUMMARY

Aspects of embodiments of the present disclosure have been conceived noting the foregoing technical problems, and it is therefore an object of the present disclosure to provide a control system for a vehicle having a CO2 capturing device configured to capture CO2 certainly from gas streams.

An exemplary embodiment of the present disclosure relates to a control system for a vehicle having a CO2 capturing device that captures CO2 from gas stream and discharges the captured CO2 to an external recovery station.

In order to achieve the above-explained objective, according to the exemplary embodiment of the present disclosure, a controller is configured to: desorb the CO2 captured by the CO2 capturing device from the CO2 capturing device by an energy available in the vehicle so as to discharge the CO2 desorbed from the CO2 capturing device into the recovery station; determine whether the energy available in the vehicle is less than a predetermined value; deliver energy from the recovery station to the CO2 capturing device when the energy available in the vehicle is less than the predetermined value; and discharge the CO2 captured by the CO2 capturing device into the recovery station by the energy delivered from the recovery station to the CO2 capturing device.

In a non-limiting embodiment, the controller may be further configured to deliver the energy from the recovery station to the CO2 capturing device after the energy available in the vehicle is reduced less than the predetermined value.

In a non-limiting embodiment, the vehicle may comprise a heat accumulator, and the energy available in the vehicle may include a thermal energy accumulated in the heat accumulator.

In a non-limiting embodiment, the energy delivered from the recovery station to the CO2 capturing device may include a thermal energy.

In a non-limiting embodiment, the controller may be further configured to: desorb the CO2 from the CO2 capturing device by heating the CO2 capturing device by the thermal energy accumulated in the heat accumulator; determine whether an amount of the thermal energy accumulated in the heat accumulator is less than the predetermined value; and deliver the energy from the recovery station to the CO2 capturing device after the energy accumulated in the heat accumulator is reduced less than the predetermined value.

In a non-limiting embodiment, the controller may be further configured to: make a prediction about whether the CO2 capturing device will discharge the CO2 to the recovery station during propulsion of the vehicle; and increase the amount of the thermal energy accumulated in the heat accumulator if the CO2 capturing device will discharge the CO2 to the recovery station during propulsion of the vehicle.

In a non-limiting embodiment, the prediction may include a prediction about whether a travel plan includes a plan to stop the vehicle at the recovery station. In addition, the controller may be further configured to increase the amount of the thermal energy accumulated in the heat accumulator upon satisfaction of at least any one of conditions that a distance from a current position of the vehicle to the recovery station is shorter than a predetermined distance, and that an estimated time until the vehicle arrives at the recovery station is shorter than a predetermined time.

In a non-limiting embodiment, a prime mover of the vehicle may include at least an engine. In addition, the controller may be further configured to increase the amount of the thermal energy accumulated in the heat accumulator by controlling at least any one of a speed of the engine, an ignition timing of the engine, and an air/fuel ratio of the engine.

In a non-limiting embodiment, the controller may be further configured to calculate a required amount of the thermal energy to discharge the CO2 from the CO2 capturing device into the recovery station.

In a non-limiting embodiment, the controller may be further configured to create a travel plan possible to accumulate the thermal energy in the heat accumulator until the vehicle arrives at the recovery station, and to operate the vehicle in line with the travel plan.

In a non-limiting embodiment, the controller may be further configured to offer an incentive to carry the captured CO2 to the recovery station, and to pay an incentive compensation in accordance with an amount of the CO2 discharged from the CO2 capturing device to the recovery station.

In a non-limiting embodiment, the incentive compensation may include an incentive compensation calculated in accordance with an amount of the energy available in the vehicle supplied to the CO2 capturing device to discharge the CO2 from the CO2 capturing device into the recovery station.

In a non-limiting embodiment, the vehicle may comprise an engine that serves as a prime mover and a particulate filter that traps particulate matter in an exhaust gas emitted from the engine. In addition, the controller may be further configured to regenerate the particulate filter when discharging the CO2 from the CO2 capturing device to the recovery station, and desorb the CO2 from the CO2 capturing device by heat resulting from regenerating the particulate filter.

In a non-limiting embodiment, the controller may be further configured to desorb the CO2 from the CO2 capturing device by heating the CO2 capturing device, depressurizing the CO2 capturing device, or sucking the CO2 capturing device.

In a non-limiting embodiment, the energy available in the vehicle may include the thermal energy, an electric energy, and a pressure energy.

Thus, according to the exemplary embodiment of the present disclosure, the CO2 captured by the CO2 capturing device from the gas stream is discharged to the external recovery station using the energy available in the vehicle. If the energy available in the vehicle is less than the predetermined value, the energy is delivered to the CO2 capturing device from the recovery station to discharge the CO2 captured by the CO2 capturing device into the recovery station. According to the exemplary embodiment of the present disclosure, therefore, the CO2 may be discharged certainly from the CO2 capturing device into the recovery station.

In the case that the distance from the current position of the vehicle to the recovery station or the estimated time until the vehicle arrives at the recovery station is shorter than the predetermined value, the engine is controlled to increase the amount of the heat accumulated in the heat accumulator before the vehicle reaches the recovery station. According to the exemplary embodiment of the present disclosure, therefore, the CO2 capturing device may be heated sufficiently only by the heat delivered from the heat accumulator when the vehicle arrives at the recovery station, so as to discharge the captured CO2 completely into the recovery station.

Moreover, the vehicle is controlled in line with the plan to accumulate the required amount of heat in the heat accumulator to heat the CO2 capturing device before reaching the recovery station. According to the exemplary embodiment of the present disclosure, therefore, the CO2 capturing device may be heated sufficiently by the heat delivered from the heat accumulator when the vehicle arrives at the recovery station so as to discharge the captured CO2 completely into the recovery station.

Further, the incentive compensation is paid in accordance with the amount of CO2 discharged into the recovery station and the amount of the heat supplied to the CO2 capturing device from the heat accumulator. According to the exemplary embodiment of the present disclosure, therefore, consumers are motivated to purchase the vehicle equipped with the CO2 capturing device, and a driver and passenger(s) are motivated to collect CO2. For these reasons, CO2 may be collected while making effective use of the waste heat so as to reduce the global warming.

Furthermore, the CO2 capturing device may be heated utilizing the heat resulting from regenerating the particulate filter. According to the exemplary embodiment of the present disclosure, therefore, CO2 can be discharged from the CO2 capturing device to the recovery station while reducing a consumption of the heat delivered from the external source, or without using the hear delivered from the external heat source.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

First Example

Figure 1:
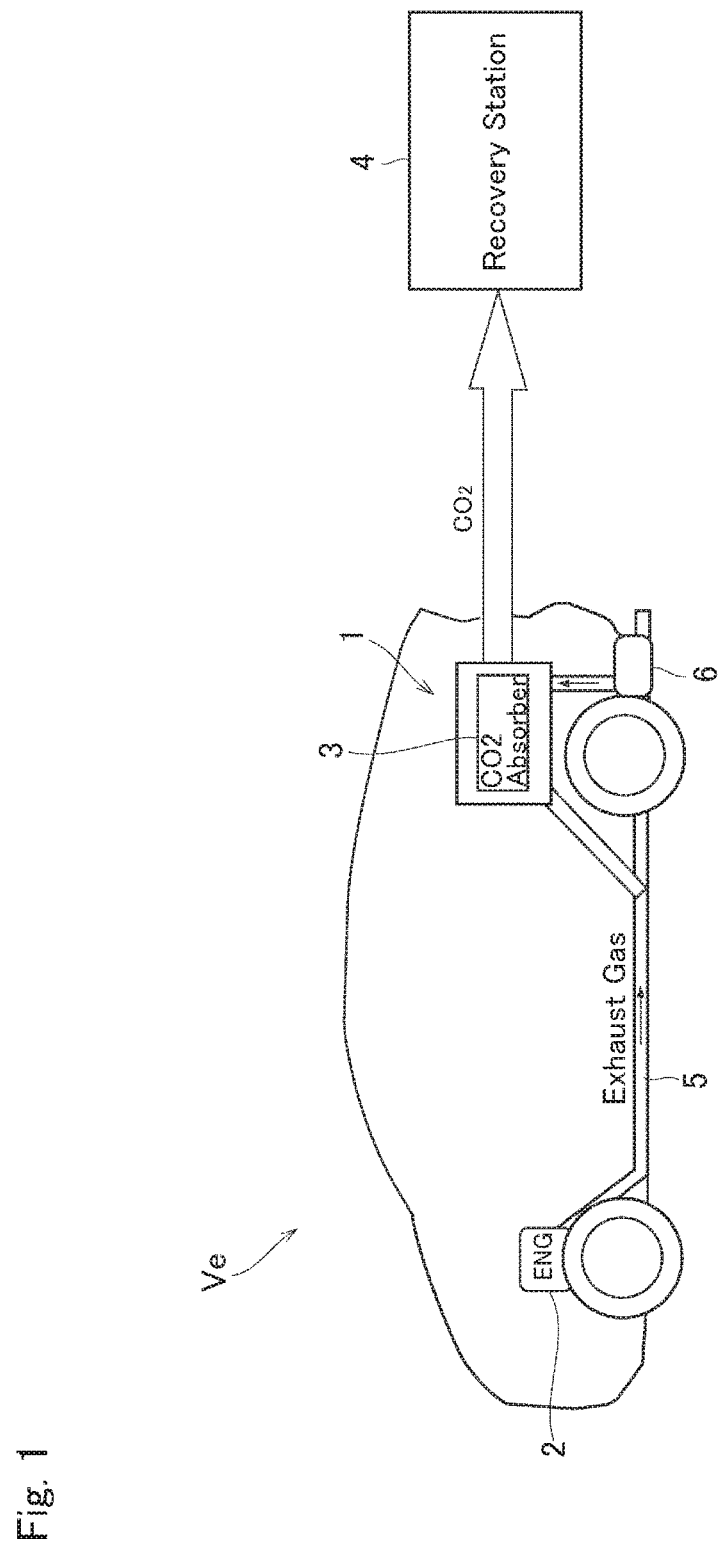
FIG. 1 is a schematic illustration showing a structure of a vehicle to which the control system according to the embodiment of the present disclosure is applied.

Turning now to FIG. 1, there is shown one example of a structure of a vehicle Ve to which the control system according to the exemplary embodiment of the present disclosure is applied. The vehicle Ve comprises a CO2 capturing device 1 and an internal combustion engine (as will be simply called the "engine" hereinafter) 2 as a prime mover. The engine 2 includes a gasoline engine and a diesel engine. The CO2 capturing device 1 comprises a CO2 absorber 3 that captures carbon dioxide (referred to as CO2 hereinafter) and the captured CO2 may be stored temporarily in a CO2 tank. In the vehicle Ve, a heat accumulator 6 is arranged on an exhaust pipe 5 so that heat emitted by the engine 2 to the exhaust pipe 5 is accumulated in the heat accumulator 6, and the CO2 absorber 3 is heated by the heat delivered from the heat accumulator 6 so that the adsorbed CO2 is desorbed from the CO2 absorber 3 to be discharged into an external recovery station 4. For example, the CO2 capturing device 1 may be disposed in a luggage room or in the vicinity of the luggage room.

Figure 2:
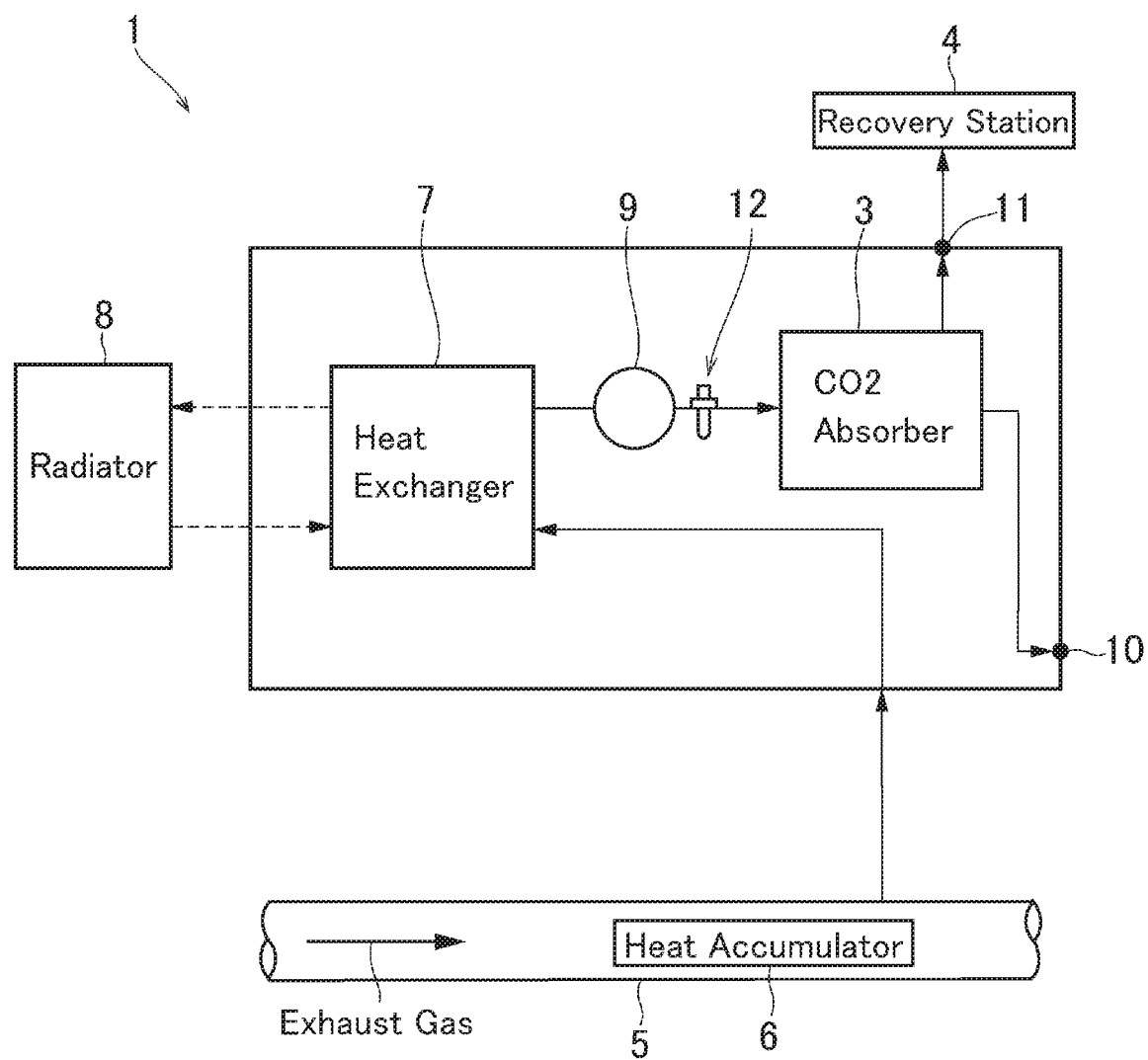
FIG. 2 is a block diagram schematically showing a structure of a CO2 capturing device of the vehicle shown in FIG. 1.

A structure of the CO2 capturing device 1 is schematically shown in FIG. 2. In the CO2 capturing device 1, the exhaust gas emitted from the engine 2 to the exhaust pipe 5 is contacted to a capturing agent of the CO2 absorber 3 so that CO2 contained in the exhaust gas is captured by the CO2 absorber 3. In addition, CO2 in the atmosphere may also be captured by the CO2 absorber 3. For example, CO2 may be captured by physical adsorption, physical absorption, chemical adsorption, and cryogenic distillation. Hereinafter, an example to capture CO2 contained in the exhaust gas of the engine 2 will be explained.

For example, given that the physical adsorption is employed in the CO2 capturing device 1, the exhaust gas is contacted to the solid capturing agent such as activated carbon and zeolite arranged in the CO2 absorber 3 so that CO2 contained in the exhaust gas is adsorbed on the capturing agent, and the capturing agent is heated or depressurized to desorb CO2 from the capturing agent.

Given that the physical absorption is employed in the CO2 capturing device 1, the exhaust gas is contacted to absorbing solution such as methanol and ethanol held in the CO2 absorber 3 under high pressure at low temperatures, and then the absorbing solution is heated or depressurized to desorb CO2 from the absorbing solution.

Given that the chemical adsorption is employed in the CO2 capturing device 1, the exhaust gas is contacted to absorbing solution such as amine held in the CO2 absorber 3 so that CO2 contained in the exhaust gas is adsorbed on the capturing solution, and the capturing solution is heated to desorb CO2 from the capturing solution.

Given that the cryogenic distillation is employed in the CO2 capturing device 1, CO2 contained in the exhaust gas is liquified by compressing and cooling the exhaust gas, and the liquified CO2 is distilled to capture the CO2.

According to the exemplary embodiment of the present disclosure, the physical adsorption is employed in the CO2 capturing device 1 to capture CO2 contained in the exhaust gas emitted from the engine 2. In this case, CO2 may be captured by the capturing agent at low temperatures, and released from the capturing agent at high temperatures. Otherwise, CO2 may also be captured by the capturing agent under high pressure, and released from the capturing agent with a reduction in the pressure.

In order to lower a temperature of the exhaust gas containing CO2 lower than an adsorption temperature of the CO2 absorber 3, in the CO2 capturing device 1 shown in FIG. 2, a heat exchanger 7 is arranged upstream of the CO2 absorber 3. Specifically, cooling water cooled by a radiator 8 circulates between the heat exchanger 7 and the radiator 8 so that heat is exchanged between the cooling water and the exhaust gas in the heat exchanger 7. A pump 9 is disposed between the heat exchanger 7 and the CO2 absorber 3 so that the exhaust gas cooled by the heat exchanger 7 is pumped to the CO2 absorber 3 to capture CO2 contained in the exhaust gas by the CO2 absorber 3. The CO2 captured by the CO2 absorber 3 is discharged into the external recovery station 4 through an outlet 11. The CO2 exceeding the capacity of the capturing agent of the CO2 absorber 3 is released into the atmosphere from another outlet 10 or returned to the exhaust pipe 5 to be emitted from an exhaust outlet. For example, the recovery station 4 may be located at a gas station, a rest area of highway, a parking lot of commercial facilities and so on.

In order to measure a flow rate of the exhaust gas introduced to the CO2 absorber 3, a flow rate sensor 12 is arranged between the heat exchanger 7 and the CO2 absorber 3. That is, an amount of CO2 captured by the CO2 absorber 3 is estimated based on a flow rate of the exhaust gas detected by the flow rate sensor 12.

Figure 3:
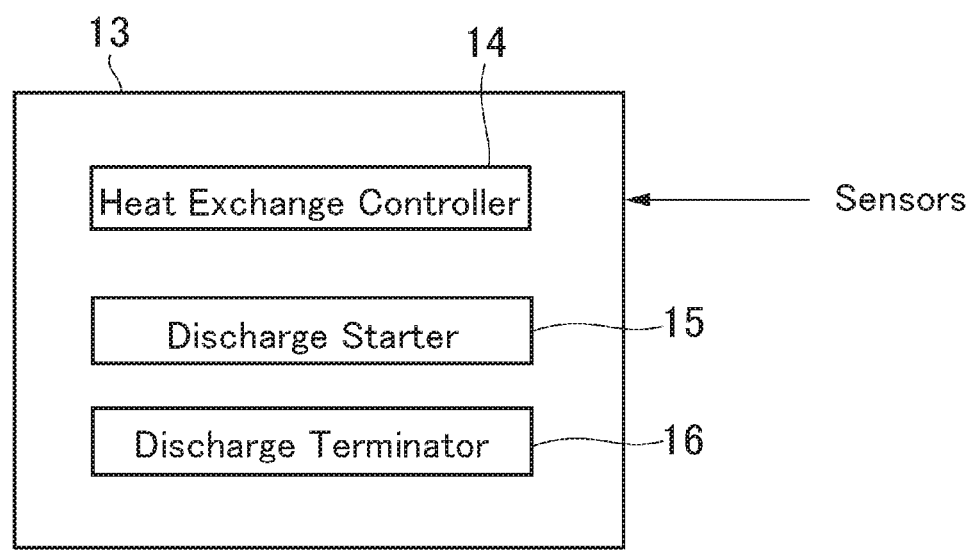
FIG. 3 is a block diagram showing a basic structure of an electronic control unit of the control system.

In the vehicle Ve, the CO2 capturing device 1 is controlled by an electronic control unit (to be abbreviated as the "ECU" hereinafter) 13 as a controller shown in FIG. 3. The ECU 13 comprises a microcomputer as its main constituent configured to perform calculation based on incident data and data stored in advance, and a calculation result is transmitted e.g., to the CO2 capturing device 1 in the form of command signal. For example, the ECU 13 controls a delivery of the exhaust gas to the CO2 absorber 3, and a discharge of CO2 from the CO2 absorber 3 to the recovery station 4.

To this end, data collected by various sensors including the flow rate sensor 12 is sent to the ECU 13. As shown in FIG. 3, the ECU 13 comprises a heat exchange controller 14 that controls the heat exchange between the cooling water and the exhaust gas, a discharge starter 15 that determines to start discharging of CO2 to the recovery station 4, and a discharge terminator 16 that determines to terminate discharging of CO2 to the recovery station 4.

When the engine 2 is in steady operation, a concentration of CO2 in the exhaust gas falls within a predetermined range. In this situation, therefore, an amount of CO2 delivered to the CO2 capturing device 1 may be obtained based on a flow rate of the exhaust gas flowing through the CO2 capturing device 1. However, when an accelerator pedal is depressed abruptly to accelerate the vehicle Ve, or when the accelerator pedal is repeatedly depressed only slightly due to traffic congestion, the concentration of CO2 contained in the exhaust gas falls out of the predetermined range. In those cases, the amount of CO2 delivered to the CO2 capturing device 1 may be obtained by correcting the flow rate of the exhaust gas flowing through the CO2 capturing device 1 by a predetermined correction coefficient. On the other hand, a capacity of the capturing agent of the CO2 absorber 3 varies depending e.g., on a temperature and a flow rate of the exhaust gas. However, the capacity of the capturing agent of the CO2 absorber 3 in every situation may be obtained based on a result of an experimentation. Accordingly, an amount of the CO2 captured by the CO2 absorber 3 per unit of time may be obtained based on the flow rate and the temperature of the exhaust gas flowing into the CO2 absorber 3 per unit of time, and a total amount of the CO2 captured by the CO2 absorber 3 may be obtained by integrating the amount of the CO2 captured by the CO2 absorber 3 per unit of time.

Thus, the total amount of the CO2 captured by the CO2 absorber 3 within a period of time from a point at which the vehicle Ve was launched to a point at which the vehicle Ve was stopped may be calculated by integrating the amount of the CO2 captured by the CO2 absorber 3 per unit of time. For this purpose, the above-mentioned flow rate sensor 12 is disposed upstream or downstream of the CO2 absorber 3 to measure a flow rate of the exhaust gas passing through the CO2 absorber 3. Instead, a pressure sensor or the like may also be arranged to directly measure an amount of the CO2 which has been desorbed from the CO2 absorber 3 and stored in the above-mentioned CO2 tank. Further, an amount of CO2 generated during operation of the engine 2 may also be estimated based on an amount of fuel injection.

Figure 4:
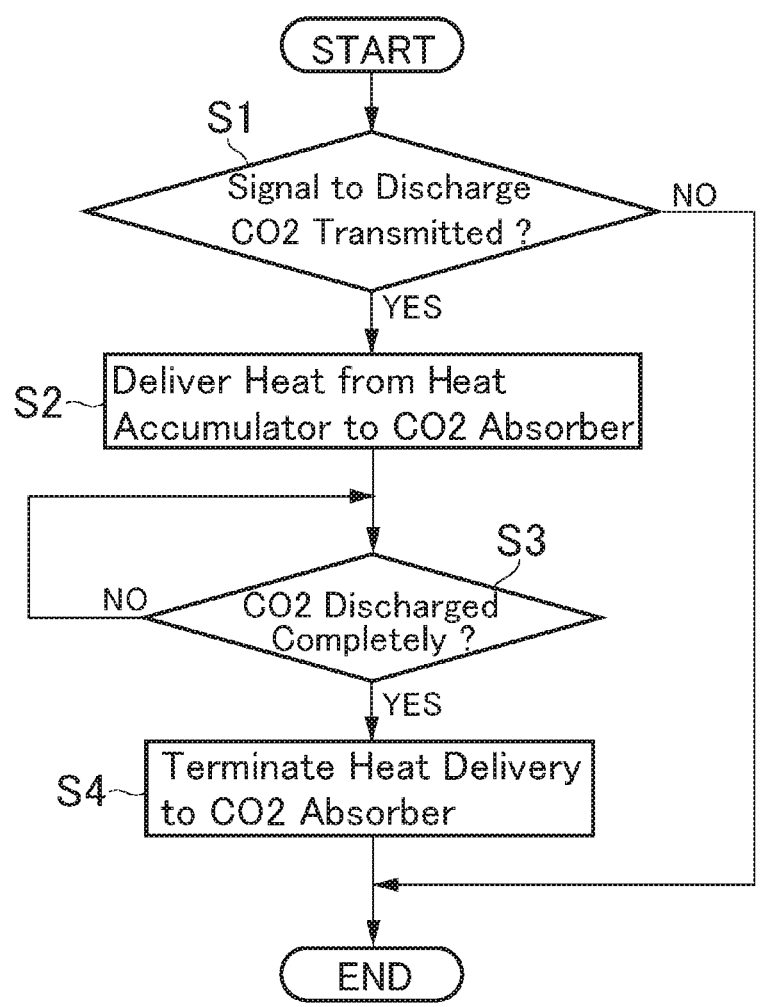
FIG. 4 is a flowchart showing a basic routine to supply heat from a heat accumulator to a CO2 absorber.

Here will be explained an example of a basic routine to discharge CO2 captured by the CO2 capturing device 1 to the recovery station 4 with reference to FIG. 4. At step S1, it is determined whether the ECU 13 receives a command signal to discharge CO2 captured by the CO2 capturing device 1 to the recovery station 4. Specifically, such determination at step S1 is made by the discharge starter 15. For example, the command signal to discharge the CO2 to the recovery station 4 is transmitted to the ECU 13 when the outlet 11 is connected to the recovery station 4 through a hose (not shown), or when the vehicle Ve arrives at a site where the recovery station 4 is located. If the command signal to discharge the CO2 to the recovery station 4 is not transmitted to the ECU 13 so that the answer of step S1 is NO, the routine returns without carrying out any specific control.

By contrast, if the command signal to discharge the CO2 to the recovery station 4 has been transmitted to the ECU 13 so that the answer of step S1 is YES, the routine progresses to step S2 to deliver heat from the heat accumulator 6 to the CO2 absorber 3. Consequently, the CO2 absorber 3 is heated by the heat delivered from the heat accumulator 6 so that the CO2 captured by the CO2 absorber 3 is desorbed from the CO2 absorber 3, and the CO2 desorbed from the CO2 absorber 3 is discharged into the recovery station 4. As described, according to the exemplary embodiment of the present disclosure, the heat is accumulated in the heat accumulator 6 utilizing a thermal energy derived from the waste heat generated by the exhaust gas emitted from the engine 2. However, the heat accumulator 6 may also be heated by an electric energy supplied from a battery (not shown).

Then, it is determined at step S3 whether the CO2 has been discharged completely from the CO2 absorber 3 to the recovery station 4 by the discharge terminator 16. Specifically, the discharge terminator 16 determines the completion of the discharge of the CO2 to the recovery station 4 when a remaining amount of the CO2 in the CO2 absorber 3 is reduced less than a predetermined value set substantially to zero. If the CO2 has not yet been discharged completely from the CO2 absorber 3 to the recovery station 4 so that the answer of step S3 is NO, the determination at step S3 is repeated until the CO2 is discharged completely from the CO2 absorber 3 to the recovery station 4.

By contrast, if the CO2 has been discharged completely from the CO2 absorber 3 to the recovery station 4 so that the answer of step S3 is YES, the routine progresses to step S4 to terminate delivery of the heat from the heat accumulator 6 to the CO2 absorber 3. Thereafter, the routine returns.

Thus, according to the exemplary embodiment of the present disclosure, the CO2 captured by the CO2 absorber 3 is desorbed from the CO2 absorber 3 by the thermal energy accumulated in the heat accumulator 6 when discharged to the recovery station 4. For example, the CO2 is discharged from the CO2 absorber 3 to the recovery station 4 when an amount of the CO2 captured by the CO2 absorber 3 reaches the capacity of the capturing agent of the CO2 absorber 3. However, if the thermal energy has not yet been accumulated sufficiently in the heat accumulator 6 when discharging the CO2 from the CO2 absorber 3 to the recovery station 4, the CO2 may not be discharged completely from the CO2 absorber 3 to the recovery station 4.

Figure 5:
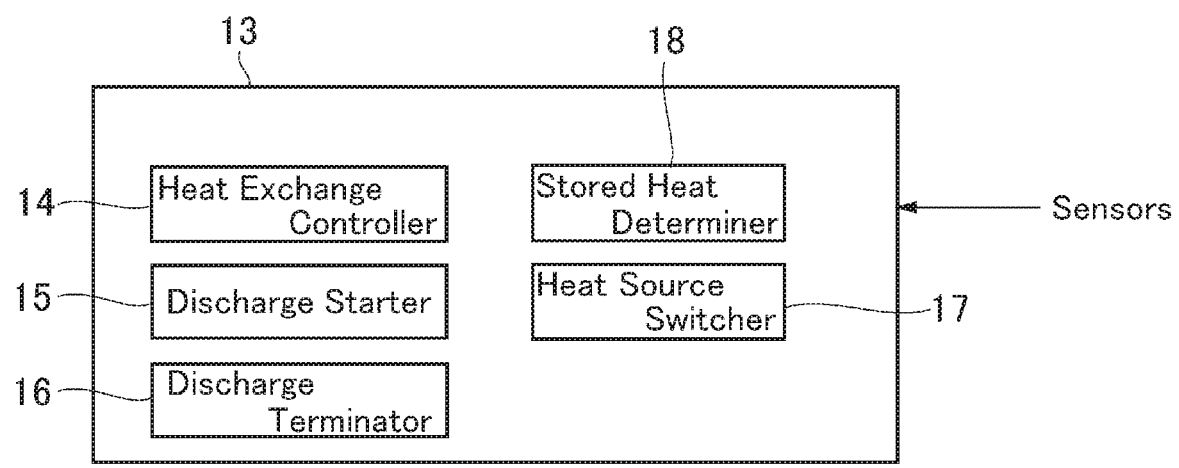
FIG. 5 is a block diagram showing a structure of the electronic control unit of the control system according to the first example.

In order to avoid such disadvantage, as shown in FIG. 5, the ECU 13 further comprises a heat source switcher 17 that switches a heat source to heat the CO2 absorber 3, and a stored heat determiner 18 that determines an amount of heat accumulated in the heat accumulator 6.

Figure 6:
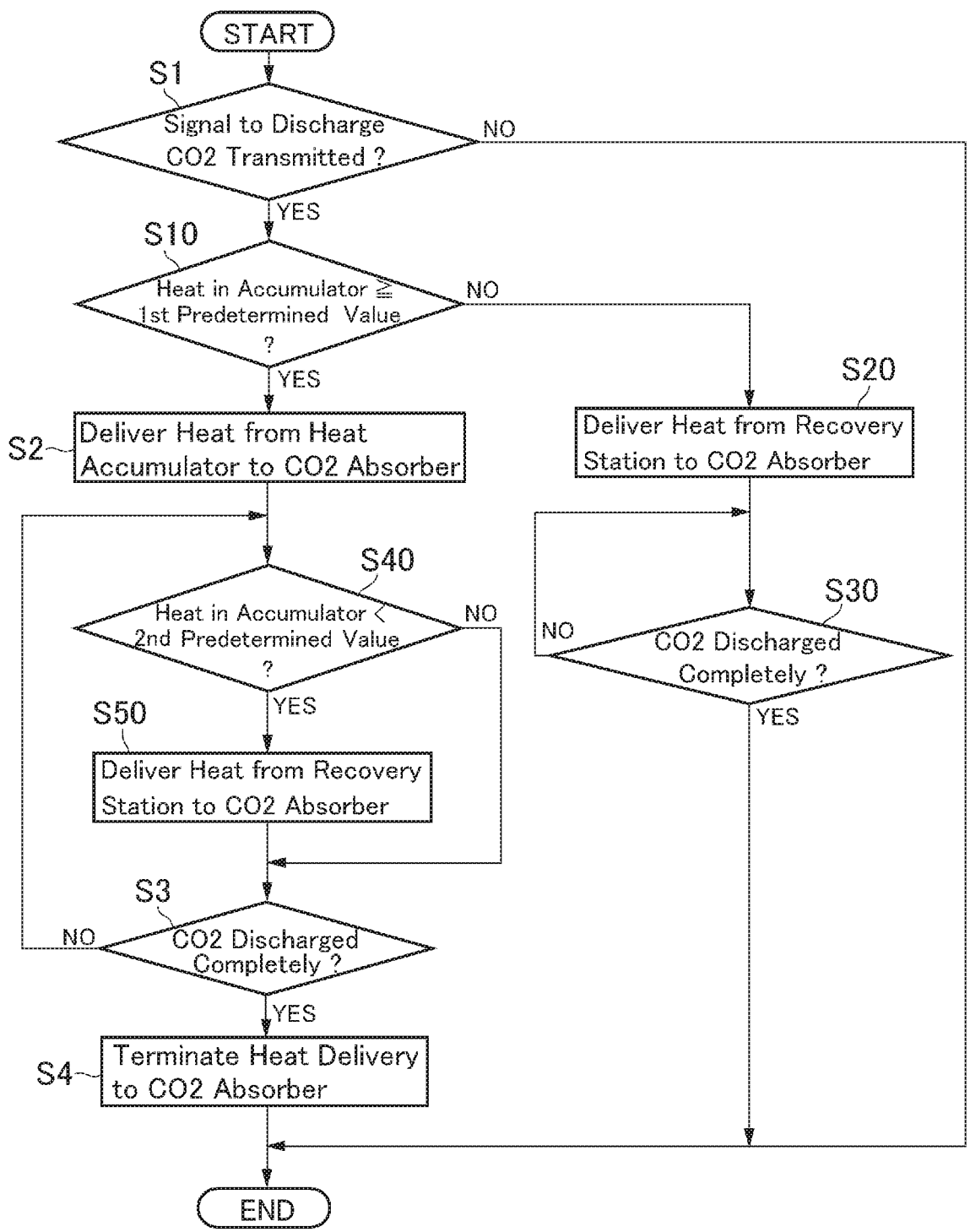
FIG. 6 is a flowchart showing a routine executed by the electronic control unit according to the first example.

Turning to FIG. 6, there is shown a routine to selectively switch a heat source to heat the CO2 absorber 3 according to the first example. In the following description, explanations for the steps in common with the routine shown in FIG. 4 will be simplified.

At step S1, it is determined whether the ECU 13 receives the command signal to discharge the CO2 captured by the CO2 capturing device 1 to the recovery station 4. If the answer of step S1 is NO, the routine returns without carrying out any specific control. By contrast, if the command signal to discharge the CO2 to the recovery station 4 has been transmitted to the ECU 13 so that the answer of step S1 is YES, the routine progresses to step S10 to determine whether an amount of the heat accumulated in the heat accumulator 6 is equal to or greater than a first predetermined value. That is, at step S10, it is determined whether at least a predetermined amount (i.e., a lower limit amount) of the CO2 can be discharged from the CO2 absorber 3 to the recovery station 4 by heating the CO2 absorber 3 by the thermal energy currently accumulated in the heat accumulator 6. To this end, specifically, the first predetermined value is set to a calorific value possible to discharge the CO2 from the CO2 absorber 3 to the recovery station 4 at least in the lower limit amount.

If the current amount of the heat accumulated in the heat accumulator 6 is less than the first predetermined value so that the answer of step S10 is NO, the routine progresses to step S20 to deliver heat to the CO2 absorber 3 from the recovery station 4 thereby compensating shortfall of the thermal energy available in the vehicle Ve, that is, accumulated in the heat accumulator 6. In other words, in addition to the heat accumulator 6, the thermal energy is also delivered to the CO2 absorber 3 from an external source such as the recovery station 4 so as to heat the CO2 absorber 3. Here, it is preferable to deliver the heat from the recovery station 4 to the CO2 absorber 3 after the remaining amount of the heat accumulated in the heat accumulator 6 is reduced less than a predetermined value.

Then, it is determined at step S30 whether the CO2 has been discharged completely from the CO2 absorber 3 to the recovery station 4 by delivering the heat from the recovery station 4 to the CO2 absorber 3. As described, the discharge terminator 16 determines the completion of the discharging operation of CO2 to the recovery station 4 when the remaining amount of the CO2 in the CO2 absorber 3 is reduced less than the predetermined value which is set substantially to zero. If the CO2 has not yet been discharged completely from the CO2 absorber 3 to the recovery station 4 so that the answer of step S30 is NO, the routine returns to step S30 until the CO2 is discharged completely from the CO2 absorber 3 to the recovery station 4.

By contrast, if the CO2 has been discharged completely from the CO2 absorber 3 to the recovery station 4 so that the answer of step S30 is YES, the routine returns.

If the current amount of the heat accumulated in the heat accumulator 6 is equal to or greater than the first predetermined value so that the answer of step S10 is YES, the routine progresses to step S2 to deliver the heat from the heat accumulator 6 to the CO2 absorber 3. In this case, a requisite amount of the heat is accumulated in the heat accumulator 6, therefore, the heat is delivered to the CO2 absorber 3 only from the heat accumulator 6 to desorb the CO2 from the CO2 absorber 3, and the CO2 desorbed from the CO2 absorber 3 is discharged into the recovery station 4.

Then, it is determined at step S40 whether a current amount of the heat accumulated in the heat accumulator 6 is less than a second predetermined value. In this case, the amount of the heat accumulated in the heat accumulator 6 has been reduced as a result of heating the CO2 absorber 3. At step S40, therefore, the stored heat determiner 18 determines whether it is possible to discharge the CO2 completely from the CO2 absorber 3 to the recovery station 4 only by the remaining heat accumulated in the in the heat accumulator 6. To this end, the second predetermined value is set equal to or smaller than the first predetermined value.

If the current amount of the heat accumulated in the heat accumulator 6 is less than the second predetermined value so that the answer of step S40 is YES, the routine progresses to step S50 to deliver heat to the CO2 absorber 3 from the recovery station 4 instead of the heat accumulator 6. That is, in this case, the heat accumulated in the heat accumulator 6 is insufficient to discharge the CO2 completely from the CO2 absorber 3 to the recovery station 4. Therefore, the heat source to heat the CO2 absorber 3 is switched from the heat accumulator 6 to the recovery station 4. Here, it is also preferable to deliver the heat from the recovery station 4 to the CO2 absorber 3 after the remaining amount of the heat accumulated in the heat accumulator 6 is reduced less than the predetermined value.

Then, it is determined at step S3 whether the CO2 has been discharged completely from the CO2 absorber 3 to the recovery station 4 by heating the CO2 absorber 3 by the heat delivered from the recovery station 4. By contrast, if the current amount of the heat accumulated in the heat accumulator 6 is equal to or greater than the second predetermined value so that the answer of step S40 is NO, the routine progresses directly to step S3 to determine whether the CO2 has been discharged completely from the CO2 absorber 3 to the recovery station 4 by the discharge terminator 16. If the CO2 has not yet been discharged completely from the CO2 absorber 3 to the recovery station 4 so that the answer of step S3 is NO, the routine returns to step S40 until the CO2 is discharged completely from the CO2 absorber 3 to the recovery station 4.

By contrast, if the CO2 has been discharged completely from the CO2 absorber 3 to the recovery station 4 so that the answer of step S3 is YES, the routine progresses to step S4 to terminate delivery of the heat from the heat accumulator 6 to the CO2 absorber 3. Thereafter, the routine returns.

Thus, according to the first example, the CO2 absorber 3 is heated by the thermal energy accumulated in the heat accumulator 6 to desorb the CO2 captured by the CO2 absorber 3, and the CO2 desorbed from the CO2 absorber 3 is discharged into the recovery station 4. If an amount of the heat accumulated in the heat accumulator 6 is less than the predetermined value, the heat is delivered from the recovery station 4 to the CO2 absorber 3 so that the CO2 is desorbed from the CO2 absorber 3. According to the first example, therefore, the CO2 captured by the CO2 absorber 3 can be discharged completely into the recovery station 4 even if the heat accumulated in the heat accumulator 6 is insufficient.

Second Example

Figure 7:
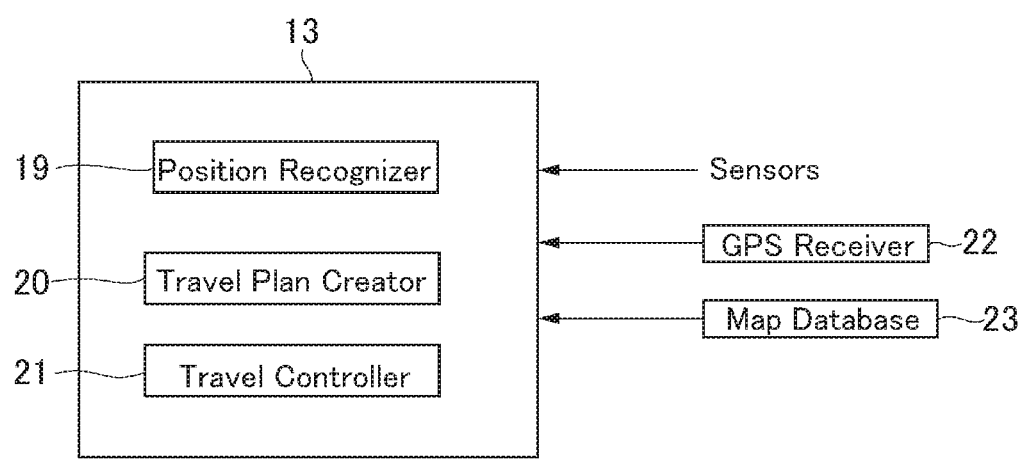
FIG. 7 is a block diagram showing a structure of the electronic control unit of the control system according to the second and the third examples.

Turning to FIG. 7, there is shown a structure of the ECU 13 according to the second example. According to the second example, in order to operate the vehicle Ve in line with a travel plan, the ECU 13 further comprises a position recognizer 19, a travel plan creator 20, and a travel controller 21, in addition to the component elements shown in FIG. 5.

Specifically, the position recognizer 19 is configured to recognize a current position of the vehicle Ve on a map based on positional information transmitted from a GPS receiver 22 and a map database 23. The current position of the vehicle Ve may also be obtained from a navigation system (not shown). Optionally, the vehicle Ve may also be adapted to communicate with external sensors arranged along the road to obtain the current position of the vehicle Ve.

The travel plan creator 20 is configured to create a travel plan based on a planned route created by the navigation system, accumulated data relating to a travel history of the vehicle Ve, a current position of the vehicle Ve detected by the position recognizer 19, and so on.

The travel plan created by the travel plan creator 20 includes a plan to increase heat generation of the engine 2 so as to increase an amount of heat accumulated in the heat accumulator 6. For example, heat generation of the engine 2 may be increased by retarding an ignition timing to a point at which air/fuel mixture is ignited during an exhaust stroke. Consequently, the exhaust gas of higher temperature flows through the exhaust pipe 5 so that the heat is accumulated in the heat accumulator 6. The heat generation of the engine 2 may also be increased by changing an air/fuel ratio to a rich air/fuel ratio, or by increasing a speed of the engine 2.

The travel controller 21 is configured to operate the vehicle Ve in line with the travel plan created by the travel plan creator 20. To this end, for example, the travel controller 21 transmits command signals to the engine 2 and the CO2 capturing device 1.

Figure 8:
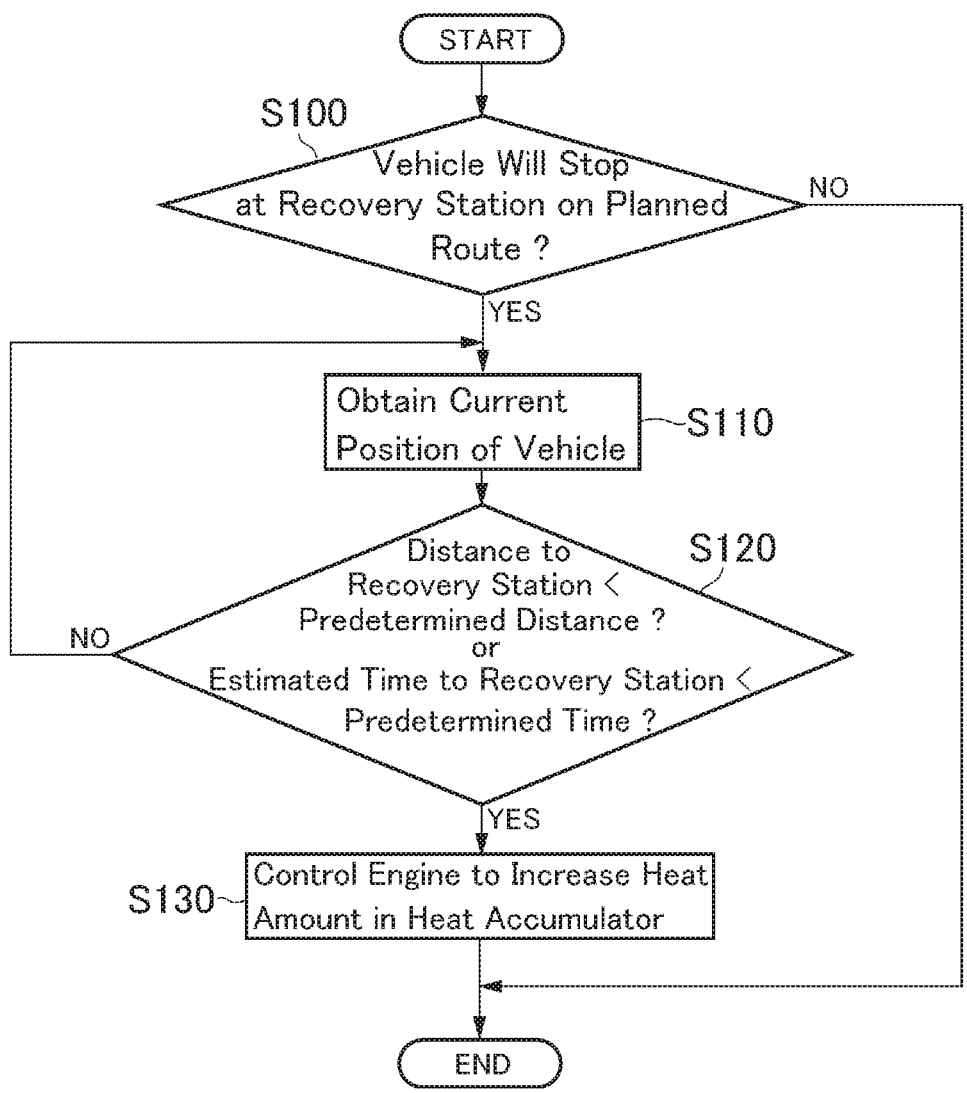
FIG. 8 is a flowchart showing a routine executed by the electronic control unit according to the second example.

According to the second example, if the travel plan includes a plan to stop the vehicle Ve at the recovery station 4 on the way to the destination, it is preferable to accumulate heat sufficiently in the heat accumulator 6 before arriving at the recovery station 4. To this end, the ECU 13 executes the routine shown in FIG. 8 when the amount of heat accumulated in the heat accumulator 6 is reduced lower than the predetermined value.

At step S100, it is determined whether the travel plan includes a plan to stop the vehicle Ve at the recovery station 4 on the planned route. That is, at step S100, the ECU 13 makes a prediction about whether the CO2 absorber 3 will discharge the CO2 to the recovery station 4 before arriving at the destination. If the vehicle Ve will not stop at the recovery station 4 on the planned route so that the answer of step S100 is NO, the routine returns without carrying out any specific control.

By contrast, if the travel plan includes the plan to stop the vehicle Ve at the recovery station 4 on the planned route so that the answer of step S100 is YES, the routine progresses to step S110 to determine a current position of the vehicle Ve. Specifically, the current position of the vehicle Ve is obtained by the position recognizer 19 based on the positional information transmitted from the GPS receiver 22 with reference to the map database 23.

Then, it is determined at step S120 whether a distance from the current position of the vehicle Ve to the recovery station 4 is shorter than a predetermined distance, or whether an estimated time until the vehicle Ve arrives at the recovery station 4 is shorter than a predetermined time. In order to increase the amount of heat accumulated in the heat accumulator 6, it is necessary to propel the vehicle Ve while activating the engine 2 for a predetermined period of time or a predetermined distance. If, however, the distance from the current position of the vehicle Ve to the recovery station 4 is relatively long and the heat accumulated in the heat accumulator 6 is consumed for other purposes (e.g., for the cooling purpose), the amount of the heat accumulated in the heat accumulator 6 becomes insufficient to heat the $CO_2$ absorber 3 to discharge $CO_2$ completely into the recovery station 4.

In order to avoid such disadvantage, the predetermined distance and the predetermined time are individually set to a value possible to discharge the $CO_2$ completely from the $CO_2$ absorber 3 to the recovery station 4 only by the thermal energy accumulated in the heat accumulator 6 by operating the engine 2 in a normal manner, even if the heat accumulated in the heat accumulator 6 consumed for other purposes on the way to the recovery station 4.

If the distance from the current position of the vehicle Ve to the recovery station 4 is equal to or longer than the predetermined distance, and the estimated time until the vehicle Ve arrives at the recovery station 4 is equal to or longer than the predetermined time so that the answer of step S120 is NO, the determination at step S120 is repeated.

By contrast, if the distance from the current position of the vehicle Ve to the recovery station 4 is shorter than the predetermined distance, or if the estimated time until the vehicle Ve arrives at the recovery station 4 is shorter than the predetermined time so that the answer of step S120 is YES, the routine progresses to step S130 to control the engine 2 in such a manner as to increase the amount of the heat accumulated in the heat accumulator 6 before the vehicle Ve arrives at the recovery station 4. For example, the amount of the heat accumulated in the heat accumulator 6 may be increased by switching the air/fuel ratio to the rich air/fuel ratio, by increasing a rotational speed of the engine 2, or by executing the ignition retard of the engine 2. That is, a way of increasing the amount of the heat accumulated in the heat accumulator 6 is not limited to a specific manner.

Thus, in the case that the distance from the current position of the vehicle Ve to the recovery station 4 or the estimated time until the vehicle Ve arrives at the recovery station 4 is shorter than the predetermined value, the engine 2 is controlled to increase the amount of the heat accumulated in the heat accumulator 6 before the vehicle Ve arrives at the recovery station 4. According to the second example, therefore, the $CO_2$ absorber 3 can be heated sufficiently only by the heat delivered from the heat accumulator 6 when the vehicle Ve arrives at the recovery station 4, so as to discharge the captured $CO_2$ completely into the recovery station 4.

Third Example

Figure 9:
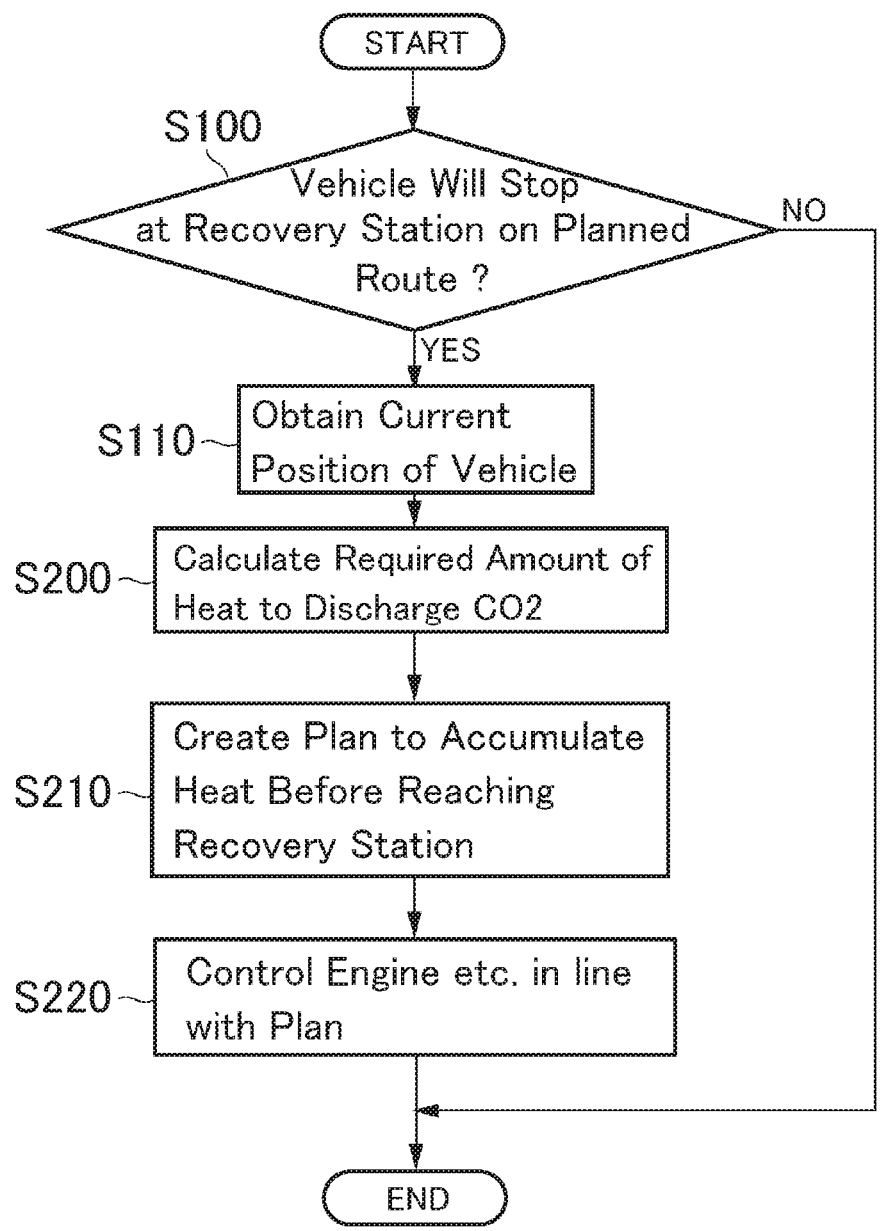
FIG. 9 is a flowchart showing a routine executed by the electronic control unit according to the third example.

Turning to FIG. 9, there is shown a routine executed by the ECU 13 according to the third example. According to the third example, the travel plan creator 20 creates the travel plan from the current position of the vehicle Ve to the recovery station 4 including a plan to accumulate a required amount of heat in the heat accumulator 6 to discharge $CO_2$ from the $CO_2$ absorber 3 into the recovery station 4.

In the following description, explanations for the steps in common with the foregoing routines will be simplified. At step S100, it is determined whether the travel plan includes a plan to stop the vehicle Ve at the recovery station 4 on the planned route. If the travel plan includes the plan to stop the vehicle Ve at the recovery station 4 on the planned route so that the answer of step S100 is YES, the routine progresses to step S110 to determine a current position of the vehicle Ve.

Then, at step S200, a required amount of heat to completely discharge $CO_2$ from the $CO_2$ absorber 3 into the recovery station 4 is calculated based e.g., on an amount of $CO_2$ captured by the $CO_2$ absorber 3. Optionally, the required amount of heat may be calculated in such a manner as to include a predetermined additional value taking account of e.g., a detection error of the amount of $CO_2$ captured by the $CO_2$ absorber 3. Here, step S110 and step S200 may be executed simultaneously, or an order to execute step S110 and step S200 may be switched according to need.

Then, at step S210, the travel plan creator 20 creates a plan to accumulate the required amount of heat in the heat accumulator 6 to discharge $CO_2$ from the $CO_2$ absorber 3 into the recovery station 4, until the vehicle Ve arrives at the recovery station 4. As described, heat generation of the engine 2 may be adjusted by controlling the air/fuel ratio, by controlling a rotational speed of the engine 2, and by executing the ignition retard. In addition, it is also possible to accumulate heat in the heat accumulator 6 by controlling a gear stage of a transmission (not shown) or by heating the heat accumulator 6 by a heater (not shown). That is, a way of increasing the amount of the heat accumulated in the heat accumulator 6 is not limited to a specific manner. Further, the travel plan may be modified to propel the vehicle Ve to the destination in an optimally fuel efficient manner while accumulating the required amount of heat in the heat accumulator 6 until the vehicle Ve stops by the recovery station 4.

Thereafter, at step S220, the engine 2, the transmission and so on are controlled in line with the plan to accumulate the required amount of heat in the heat accumulator 6. If the vehicle Ve will not stop at the recovery station 4 on the planned route so that the answer of step S100 is NO, the routine returns without carrying out any specific control.

Thus, according to the third example, the engine 2 and so on are controlled in line with the plan to accumulate the required amount of heat in the heat accumulator 6 before reaching the recovery station 4. According to the third example, therefore, the $CO_2$ absorber 3 may also be heated sufficiently only by the heat delivered from the heat accumulator 6 when the vehicle Ve arrives at the recovery station 4, so as to discharge the captured $CO_2$ completely into the recovery station 4.

Fourth Example

Figure 10:
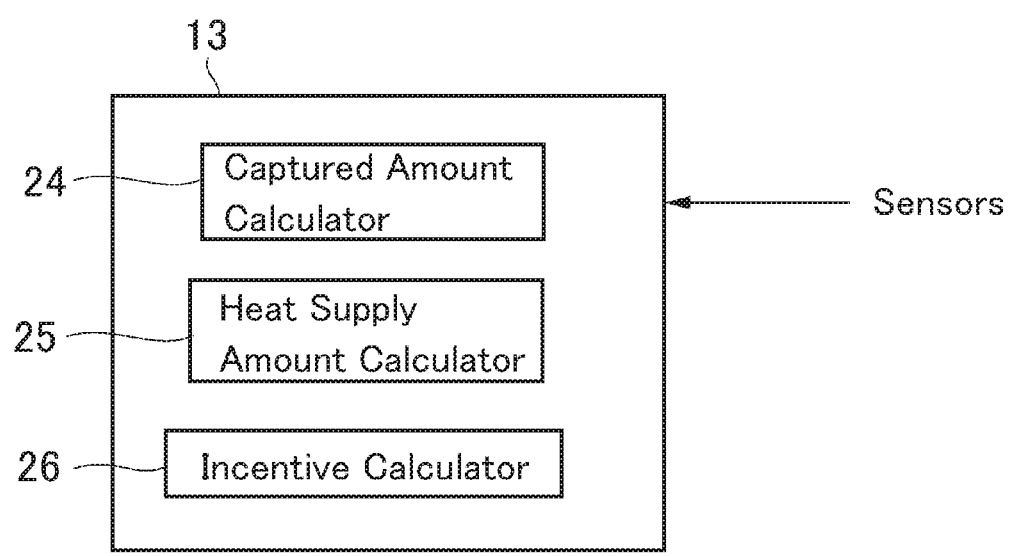
FIG. 10 is a block diagram showing a structure of the electronic control unit of the control system according to the fourth example.

Turning to FIG. 10, there is shown a structure of the ECU 13 according to the fourth example. According to the fourth example, the ECU 13 is further configured to offer an incentive e.g., to a driver of the vehicle Ve to carry the captured $CO_2$ to the recovery station 4. To this end, the ECU 13 further comprises a captured amount calculator 24, a heat supply amount calculator 25, and an incentive calculator 26.

Specifically, the captured amount calculator 24 is configured to calculate an amount of $CO_2$ discharged into the recovery station 4 based e.g., on a flow rate of the exhaust gas detected by the flow rate sensor 12, and an amount of the $CO_2$ accumulated in the $CO_2$ tank detected by another sensor. The heat supply amount calculator 25 is configured to calculate an amount of heat supplied to the $CO_2$ absorber 3 from the heat accumulator 6 when discharging $CO_2$ from to the recovery station 4. The incentive calculator 26 is configured to calculate a first incentive compensation in accordance with an amount of $CO_2$ discharged into the recovery station 4, and a second incentive compensation in accordance with an amount of heat supplied to the $CO_2$ absorber 3 from the heat accumulator 6 (i.e., a heat consumption). The first incentive compensation and the second incentive compensation calculated by the incentive calculator 26 are paid to the driver or passenger(s).

Figure 11:
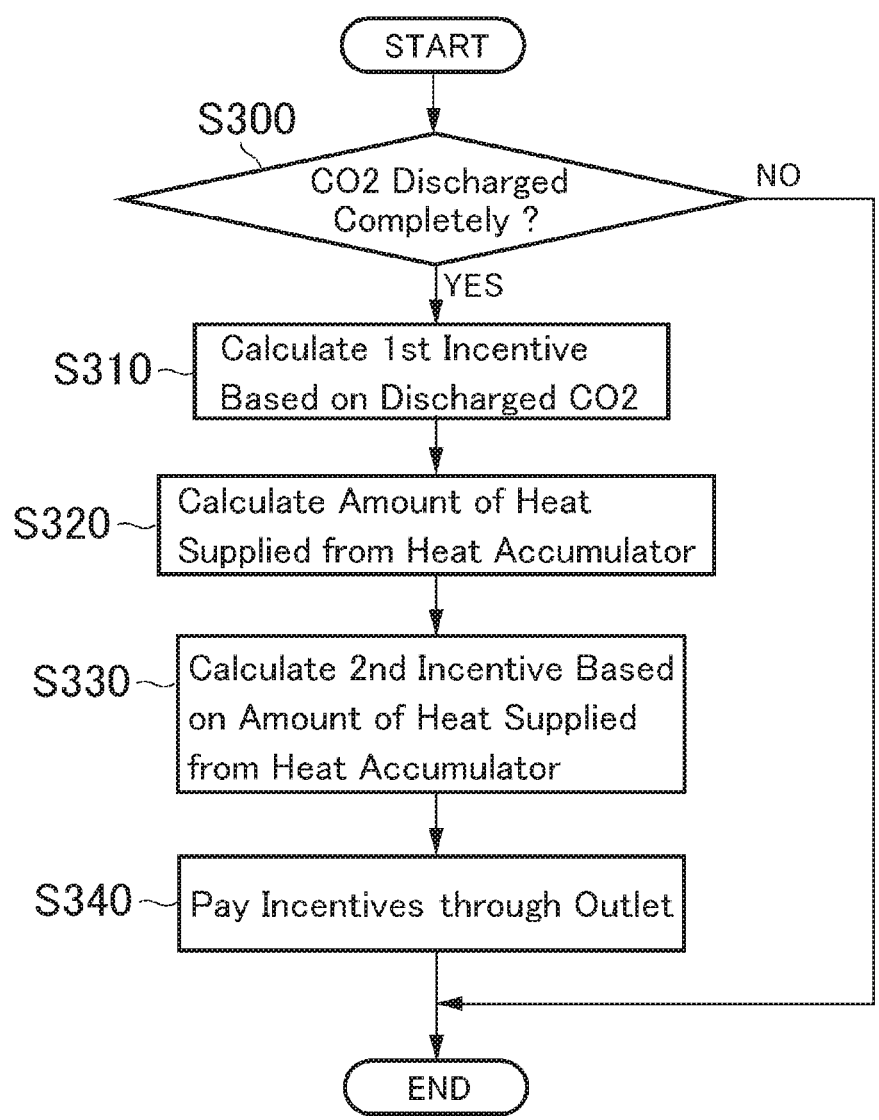
FIG. 11 is a flowchart showing a routine executed by the electronic control unit according to the fourth example.

Turning to FIG. 11, there is shown a routine to provide an incentive to e.g., the driver of the vehicle Ve. At step S300, it is determined whether a discharging operation of CO2 from the CO2 absorber 3 to the recovery station 4 has been completed. Specifically, the discharge terminator 16 determines that the discharging operation has been completed when a remaining amount of the CO2 in the CO2 absorber 3 is reduced to substantially zero. If the discharging operation has not yet been completed so that the answer of step S300 is NO, the routine returns without carrying out any specific control.

By contrast, if the discharging operation of CO2 to the recovery station 4 has been completed so that the answer of step S300 is YES, the routine progresses to step S310 to calculate the first incentive compensation in accordance with an amount of CO2 discharged into the recovery station 4. Specifically, at step S310, the first incentive compensation is calculated by the incentive calculator 26 as an amount of money to be paid e.g., to the driver in accordance with the amount of CO2 discharged into the recovery station 4 calculated by the captured amount calculator 24. Instead, the first incentive compensation may also be calculated with reference to a map (not shown) determining a relation between the amount of CO2 discharged into the recovery station 4 and the first incentive compensation.

Then, at step S320, an amount of heat supplied to the CO2 absorber 3 from the heat accumulator 6 is calculated. As described, the CO2 captured by the CO2 absorber 3 is discharged into the recovery station 4 by heating the CO2 absorber 3 by the heat accumulated in the heat accumulator 6, or by the heat delivered from the recovery station 4 if the amount of the heat accumulated in the heat accumulator 6 is less than the first predetermined value. According to the fourth example, therefore, the second incentive compensation is also paid e.g., to the driver in accordance with an amount of heat supplied to the CO2 absorber 3 from the heat accumulator 6. In order to calculate the second incentive compensation, at step S320, the amount of heat supplied to the CO2 absorber 3 from the heat accumulator 6 is calculated by the heat supply amount calculator 25.

Then, at step S330, the second incentive compensation is calculated by the incentive calculator 26 based on the amount of heat supplied to the CO2 absorber 3 from the heat accumulator 6 calculated by the heat supply amount calculator 25. Instead, the second incentive compensation may also be calculated with reference to a map (not shown) determining a relation between the amount of the heat supplied to the CO2 absorber 3 from the heat accumulator 6 and the second incentive compensation. Here, step S310 and steps S320 and S330 may be executed simultaneously, or steps S310 and S330 may be executed after calculating the amount of heat at step S320.

Thereafter, at step S340, the first incentive compensation and the second incentive compensation are paid e.g., to the driver through a return outlet (not shown) of the recovery station 4. For example, the first incentive compensation and the second incentive compensation may be paid not only in the form of coins and bank notes, but also in the form of electronic money, virtual currency, points, discount ticket etc. Instead, the first incentive compensation and the second incentive compensation may also be paid in the form of recycled resources such as fuel. Alternatively, the first incentive compensation and the second incentive compensation may also be paid into a bank account of e.g., the driver.

Thus, according to the fourth example, the incentive compensations are paid e.g., to the driver of the vehicle Ve in accordance with the amount of CO2 discharged into the recovery station 4 and the amount of heat supplied to the CO2 absorber 3 from the heat accumulator 6. According to the fourth example, therefore, consumers are motivated to purchase and use the vehicle equipped with the CO2 capturing device 1, and the driver and passenger(s) are motivated to collect CO2. For these reasons, CO2 may be collected while making effective use of the waste heat without using an external heat source, and the global warming can be reduced.

Fifth Example

According to the fifth example, a particulate filter is regenerated when desorbing CO2 from the CO2 absorber 3, and the CO2 absorber 3 is heated by heat resulting from regenerating the particulate filter.

Figure 12:
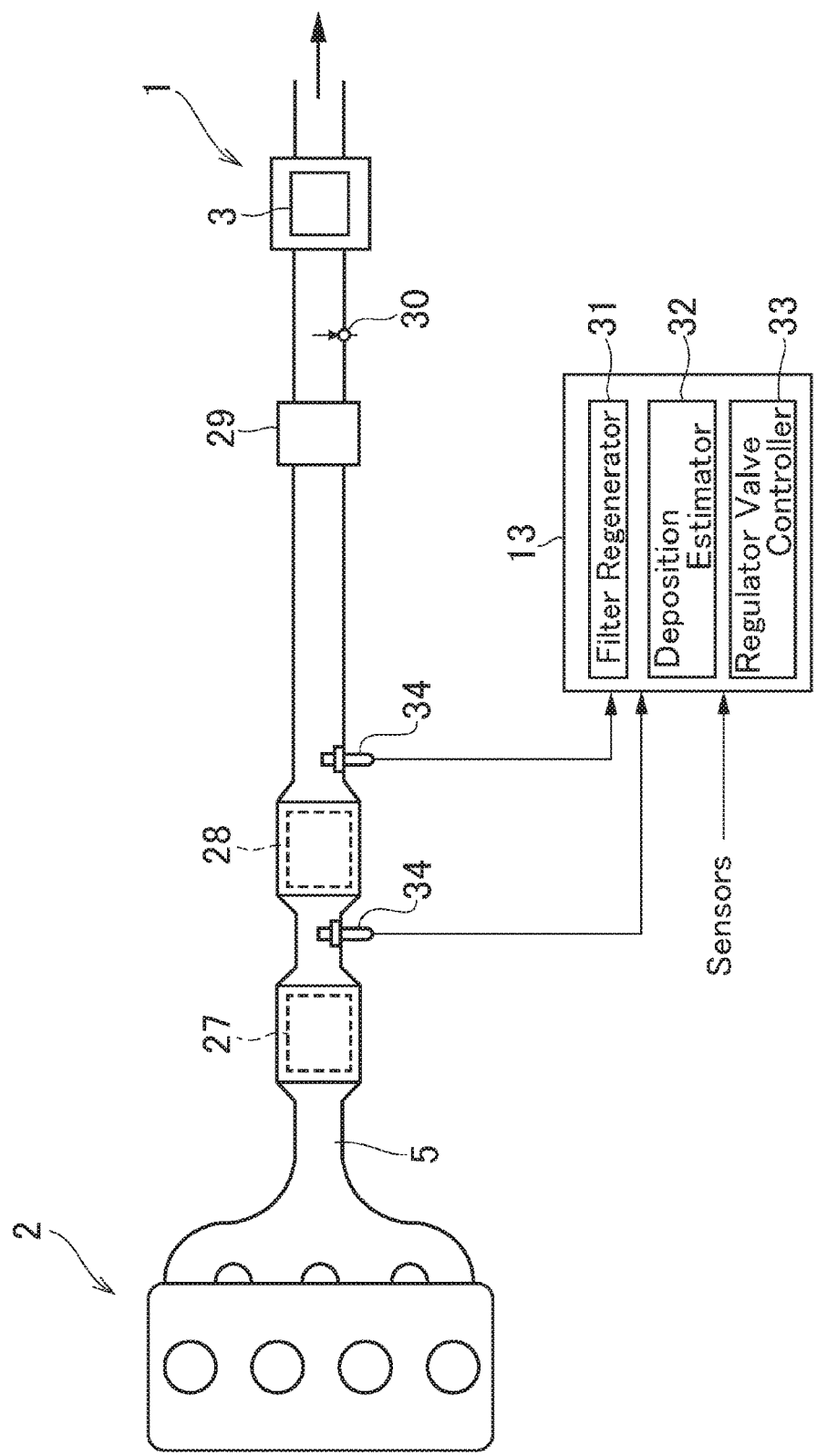
FIG. 12 is a schematic illustration showing structures of an engine and an exhaust pipe according to the fifth example.

Turning to FIG. 12, there are shown structures of the engine 2 and the exhaust pipe 5 according to the fifth example. As illustrated in FIG. 12, according to the fifth example, a purification catalyst 27 as a three-way catalyst is arranged in the exhaust pipe 5 so as to oxidize or reduce detrimental substance contained in the exhaust gas emitted from the engine 2. In the exhaust pipe 5, a particulate filter 28 is arranged downstream of the purification catalyst 27 to trap particulate matter in the exhaust gas, and a muffler 29 is arranged downstream of the particulate filter 28 to reduce exhaust noise by reducing a temperature and a pressure of the exhaust gas flowing through the exhaust pipe 5. The CO2 capturing device 1 including the CO2 absorber 3 is disposed downstream of the muffler 29, and a regulator valve 30 is disposed between the muffler 29 and the CO2 capturing device 1 to regulate a flow rate of the exhaust gas. According to the fifth example, the ECU 13 further comprises a filter regenerator 31 that regenerates the particulate filter 28, a deposition estimator 32 that estimates a deposition amount of particulate matter on the particulate filter 28, and a regulator valve controller 33 that controls a flow rate of the exhaust gas flowing into the CO2 absorber 3.

Given that a gasoline engine is adopted as the engine 2, a gasoline particulate filter is adopted as the particulate filter 28. Given that a diesel engine is adopted as the engine 2, a diesel particulate filter is adopted as the particulate filter 28. According to the fifth example, the gasoline engine is adopted as the engine 2, and hence the gasoline particulate filter is adopted as the particulate filter 28.

Figure 13:
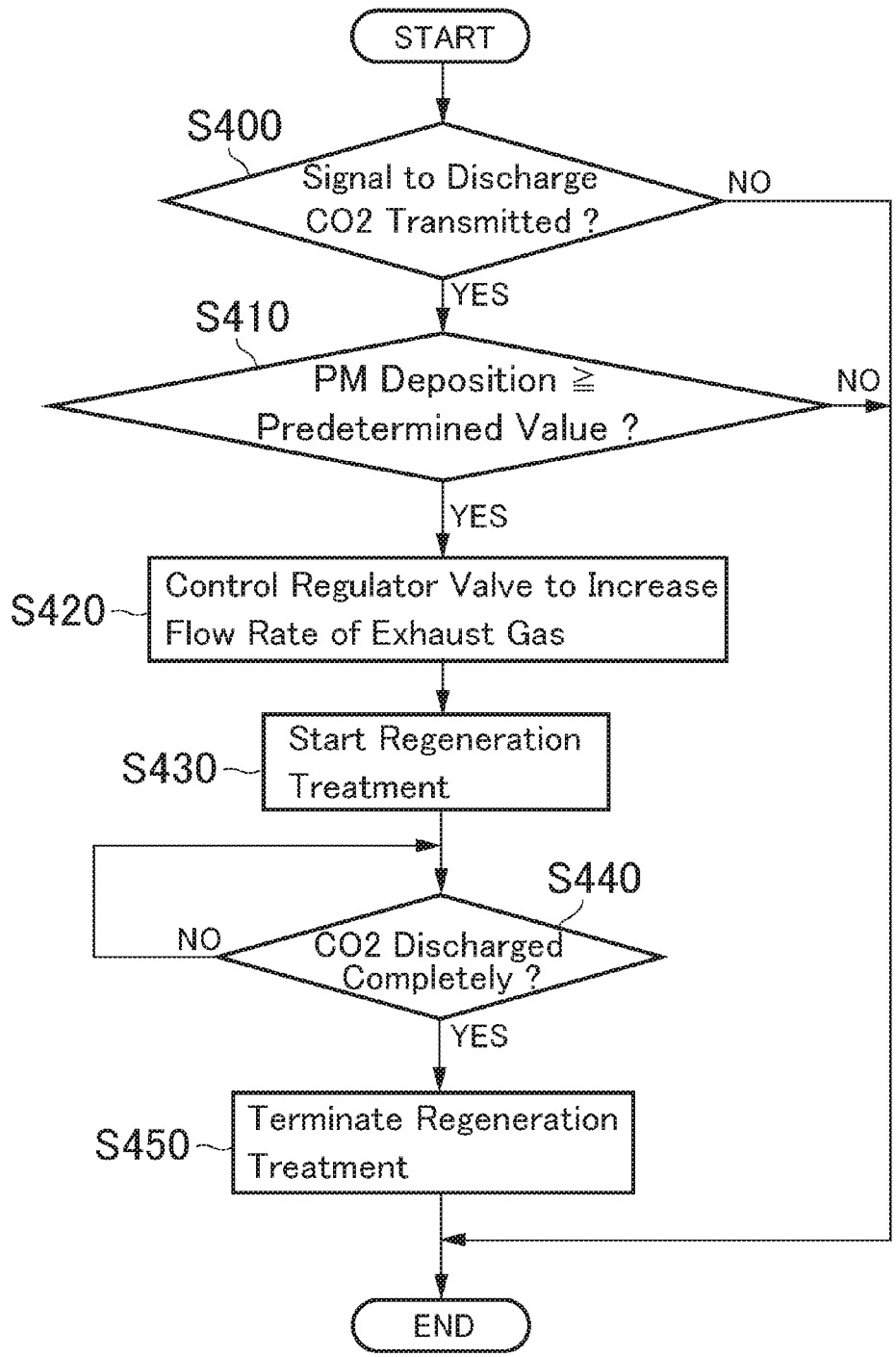
FIG. 13 is a flowchart showing a routine executed by the electronic control unit according to the fifth example.

Turning to FIG. 13, there is shown a routine to discharge CO2 into the recovery station 4 by heating the CO2 absorber 3 by the heat resulting from regenerating the particulate filter 28. The routine shown in FIG. 13 is executed when the vehicle Ve stops at the recovery station 4.

At step S400, it is determined whether the ECU 13 receives the command signal to discharge the CO2 captured by the CO2 capturing device 1 to the recovery station 4. As step S1 of the foregoing routines, the command signal to discharge the CO2 to the recovery station 4 is transmitted to the ECU 13 when e.g., the outlet 11 of the vehicle Ve is connected to the recovery station 4 through the hose (not shown). If the vehicle Ve is not connected to the recovery station 4 so that the answer of step S400 is NO, the routine returns without carrying out any specific control.

By contrast, if the vehicle Ve is connected to the recovery station 4 so that the answer of step S400 is YES, the routine progresses to step S410 to determine whether a deposition amount of particulate matter on the particulate filter 28 is equal to or greater than a predetermined value. That is, at step S410, it is determined whether it is necessary to regenerate the particulate filter 28. Specifically, the predetermined value as a threshold limit value of the deposition amount of the particulate matter on the particulate filter 28 is set to a value at which a performance of the engine 2 will be reduced by a pressure loss resulting from flowing the exhaust gas through the particulate filter 28. Such pressure loss is increased with an increase in a pressure difference between an upstream pressure of the particulate filter 28 and a downstream pressure of the particulate filter 28. Therefore, in order to estimate deposition amount of particulate matter on the particulate filter 28 based on the pressure difference between the upstream pressure of the particulate filter 28 and the downstream pressure of the particulate filter 28, pressure sensors 34 are arranged upstream of the particulate filter 28 and downstream of the particulate filter 28, and the determination at step S410 is made by the deposition estimator 32 based on a pressure difference detected by the pressure sensors 34.

If the deposition amount of particulate matter on the particulate filter 28 is less than the predetermined value so that the answer of step S410 is NO, the routine returns without carrying out any specific control. By contrast, if the deposition amount of particulate matter on the particulate filter 28 is equal to or greater than the predetermined value so that the answer of step S410 is YES, the routine progresses to step S420 to control the regulator valve 30 in such a manner as to increase a flow rate of the exhaust gas flowing through the exhaust pipe 5 toward the CO2 absorber 3.

Then, at step S430, a regeneration treatment is commenced to incinerate the particulate matter accumulated on the particulate filter 28. At step S430, specifically, the fuel is oxidized by the purification catalyst 27, and a temperature of the particulate filter 28 is raised by reaction heat resulting from oxidizing the fuel to incinerate the particulate matter accumulated on the particulate filter 28. Consequently, the particulate filter 28 is unclogged to reduce the pressure loss resulting from flowing the exhaust gas through the particulate filter 28. In this situation, since the regulator valve 30 is controlled to increase the flow rate of the exhaust gas flowing through the exhaust pipe 5, the exhaust gas whose temperature is raised by the regeneration treatment of the particulate filter 28 can be delivered sufficiently to the CO2 absorber 3 so that the CO2 captured by the CO2 absorber 3 is discharged completely into the recovery station 4.

Thereafter, it is determined at step S440 whether the CO2 has been discharged completely from the CO2 absorber 3 to the recovery station 4. As step S3 of the foregoing routines, the discharge terminator 16 determines the completion of the discharge of the CO2 to the recovery station 4 when the remaining amount of the CO2 in the CO2 absorber 3 is reduced less than the predetermined value set substantially to zero. If the CO2 has not yet been discharged completely from the CO2 absorber 3 to the recovery station 4 so that the answer of step S440 is NO, the determination at step S440 is repeated until the CO2 is discharged completely from the CO2 absorber 3 to the recovery station 4.

By contrast, if the CO2 has been discharged completely from the CO2 absorber 3 to the recovery station 4 so that the answer of step S440 is YES, the routine progresses to step S450 to terminate the regeneration treatment of the particulate filter 28. Thereafter, the routine returns.

Thus, according to the fifth example, the CO2 absorber 3 is heated utilizing the heat resulting from regenerating the particulate filter 28. According to the fifth example, therefore, CO2 can be discharged from the CO2 absorber 3 to the recovery station 4 while reducing a consumption of heat delivered from the external source, or without using the hear delivered from the external heat source.

Although the above exemplary embodiments of the present disclosure have been described, it will be understood by those skilled in the art that the present disclosure should not be limited to the described exemplary embodiments, and various changes and modifications can be made within the scope of the present disclosure. For example, CO2 may also be desorbed from the CO2 absorber 3 by heating the CO2 absorber 3 by an electric energy supplied from the battery or an electric energy for operating the heater or the pump 9. Further, CO2 may also be desorbed from the CO2 absorber 3 by sucking the CO2 absorber 3, or by depressurizing the CO2 absorber 3. That is, CO2 may be desorbed from the CO2 absorber 3 not only by the thermal energy but also by the electric energy and a pressure energy. In addition, desorption of CO2 from the CO2 absorber 3 may be expedited using a feed gas for expediting the discharge of CO2 from the CO2 absorber 3. In a case of desorbing CO2 from the CO2 absorber 3 by the feed gas containing hydrogen, methane generated by a reaction between hydrogen and the desorbed CO2 may be used as fuel.

Given that the control system and the CO2 capturing device according the exemplary embodiment of the present disclosure are applied to an electric vehicle powered only by the electric energy or a hybrid vehicle in which a prime mover comprises an engine and a motor, it is possible to make effective use of electric energy to heat the CO2 absorber by the electric energy. For example, the control system and the CO2 capturing device according the exemplary embodiment of the present disclosure may be applied to an electric vehicle in which only a motor serves as a prime mover, a range extender electric vehicle in which an engine is operated only to generate electricity, and an electric vehicle in which only a fuel cell assembly serves as a power source.

Lastly, the CO2 capturing device according the exemplary embodiment of the present disclosure may capture CO2 not only from the exhaust gas emitted from the engine 2 but also from the external air.

What is claimed is:

1. A control system for a vehicle having a CO2 capturing device that captures CO2 from gas stream and discharges the captured CO2 to an external recovery station, comprising:
   a controller that controls the vehicle,
   wherein the controller is configured to
      desorb the CO2 captured by the CO2 capturing device from the CO2 capturing device by an energy available in the vehicle so as to discharge the CO2 from the CO2 capturing device into the recovery station,
      determine whether the energy available in the vehicle is less than a predetermined value,
      deliver energy from the recovery station to the CO2 capturing device when the energy available in the vehicle is less than the predetermined value, and
      discharge the CO2 captured by the CO2 capturing device into the recovery station by the energy delivered from the recovery station to the CO2 capturing device.

2. The control system for the vehicle having the CO2 capturing device as claimed in claim 1,
   wherein the vehicle comprises a heat accumulator, and the energy available in the vehicle includes a thermal energy accumulated in the heat accumulator.

3. The control system for the vehicle having the $CO_2$ capturing device as claimed in claim 2, wherein the energy delivered from the recovery station to the $CO_2$ capturing device includes a thermal energy.

4. The control system for the vehicle having the $CO_2$ capturing device as claimed in claim 2, wherein the controller is further configured to desorb the $CO_2$ from the $CO_2$ capturing device by heating the $CO_2$ capturing device by the thermal energy accumulated in the heat accumulator, determine whether an amount of the thermal energy accumulated in the heat accumulator is less than the predetermined value, and deliver the energy from the recovery station to the $CO_2$ capturing device after the energy accumulated in the heat accumulator is reduced less than the predetermined value.

5. The control system for the vehicle having the $CO_2$ capturing device as claimed in claim 2, wherein the controller is further configured to make a prediction about whether the $CO_2$ capturing device will discharge the $CO_2$ to the recovery station during propulsion of the vehicle, and increase the amount of the thermal energy accumulated in the heat accumulator if the $CO_2$ capturing device will discharge the $CO_2$ to the recovery station during propulsion of the vehicle.

6. The control system for the vehicle having the $CO_2$ capturing device as claimed in claim 5, wherein the prediction includes a prediction about whether a travel plan includes a plan to stop the vehicle at the recovery station, and the controller is further configured to increase the amount of the thermal energy accumulated in the heat accumulator upon satisfaction of at least any one of conditions that a distance from a current position of the vehicle to the recovery station is shorter than a predetermined distance, and that an estimated time until the vehicle arrives at the recovery station is shorter than a predetermined time.

7. The control system for the vehicle having the $CO_2$ capturing device as claimed in claim 5, wherein a prime mover of the vehicle includes at least an engine, and the controller is further configured to increase the amount of the thermal energy accumulated in the heat accumulator by controlling at least any one of a speed of the engine, an ignition timing of the engine, and an air/fuel ratio of the engine.

8. The control system for the vehicle having the $CO_2$ capturing device as claimed in claim 5, wherein the controller is further configured to calculate a required amount of the thermal energy to discharge the $CO_2$ from the $CO_2$ capturing device into the recovery station.

9. The control system for the vehicle having the $CO_2$ capturing device as claimed in claim 8, wherein the controller is further configured to create a travel plan possible to accumulate the thermal energy in the heat accumulator until the vehicle arrives at the recovery station, and operate the vehicle in line with the travel plan.

10. The control system for the vehicle having the $CO_2$ capturing device as claimed in claim 1, wherein the controller is further configured to offer an incentive to carry the captured $CO_2$ to the recovery station, and pay an incentive compensation in accordance with an amount of the $CO_2$ discharged from the $CO_2$ capturing device to the recovery station.

11. The control system for the vehicle having the $CO_2$ capturing device as claimed in claim 10, wherein the incentive compensation includes an incentive compensation calculated in accordance with an amount of the energy available in the vehicle supplied to the $CO_2$ capturing device to discharge the $CO_2$ from the $CO_2$ capturing device into the recovery station.

12. The control system for the vehicle having the $CO_2$ capturing device as claimed in claim 1, wherein the vehicle comprises an engine that serves as a prime mover and a particulate filter that traps particulate matter in an exhaust gas emitted from the engine, and the controller is further configured to regenerate the particulate filter when discharging the $CO_2$ from the $CO_2$ capturing device to the recovery station, and desorb the $CO_2$ from the $CO_2$ capturing device by heat resulting from regenerating the particulate filter.

13. The control system for the vehicle having the $CO_2$ capturing device as claimed in claim 1, wherein the controller is further configured to desorb the $CO_2$ from the $CO_2$ capturing device by heating the $CO_2$ capturing device, depressurizing the $CO_2$ capturing device or sucking the $CO_2$ capturing device.

14. The control system for the vehicle having the $CO_2$ capturing device as claimed in claim 1, wherein the energy available in the vehicle includes the thermal energy, an electric energy, and a pressure energy.

* * * * *